(12) United States Patent  (10) Patent No.: US 8,007,886 B2
Tierney et al.  (45) Date of Patent: Aug. 30, 2011

(54) PERFORMANCE ENHANCING UNDERLAYMENT, UNDERLAYMENT ASSEMBLY, AND METHOD

(75) Inventors: Patrick Tierney, Castle Rock, CO (US); Ralph Michael Fay, Lakewood, CO (US)

(73) Assignee: Johns Manville, Denver, CO (US)

( * ) Notice: Subject to any disclaimer, the term of this patent is extended or adjusted under 35 U.S.C. 154(b) by 1314 days.

(21) Appl. No.: 11/316,561

(22) Filed: Dec. 21, 2005

(65) Prior Publication Data

US 2007/0137139 A1   Jun. 21, 2007

(51) Int. Cl.
*B32B 9/00* (2006.01)
*B32B 33/00* (2006.01)
*E04B 2/00* (2006.01)
*E04B 5/00* (2006.01)
*E04C 2/00* (2006.01)
*E04C 2/34* (2006.01)

(52) U.S. Cl. .............. 428/40.1; 428/40.2; 428/40.5; 428/904.4; 428/906; 52/408; 52/411; 52/506.01; 52/782.1; 52/783.1; 52/794.1

(58) Field of Classification Search .......... 428/40.1, 428/40.2, 40.5, 42.1, 904.4, 906; 52/408, 52/506.01, 782.1, 783.1, 794.1
See application file for complete search history.

(56) References Cited

U.S. PATENT DOCUMENTS

| 4,259,401 | A | * | 3/1981 | Chahroudi et al. | 52/302.3 |
|---|---|---|---|---|---|
| 4,783,354 | A | * | 11/1988 | Fagan | 428/40.5 |
| 4,871,615 | A | * | 10/1989 | Vigo et al. | 428/398 |
| 5,722,482 | A | * | 3/1998 | Buckley | 165/10 |
| 6,251,500 | B1 | * | 6/2001 | Varga et al. | 428/195.1 |
| 6,514,362 | B1 | * | 2/2003 | Zuckerman et al. | 156/79 |
| 6,758,305 | B2 | | 7/2004 | Gelin et al. | |
| 2003/0124278 | A1 | * | 7/2003 | Clark et al. | 428/35.7 |
| 2005/0244625 | A1 | | 11/2005 | Pause | |

OTHER PUBLICATIONS

Dr. Ekkehard Jahns, A Step Forward in Personal Comfort: PCM Nonwovens, Nonwoven World, Feb.-Mar. 2005, pp. 51-54.

* cited by examiner

*Primary Examiner* — Patricia L Nordmeyer
(74) *Attorney, Agent, or Firm* — Robert D. Touslee (57) ABSTRACT

An underlayment for supplementing one or more physical properties of wall, ceiling, and floor construction components is used to in a wall, ceiling, or floor assembly that may be fabricated on site. The assembly includes: first and second wall, ceiling, or floor construction components which each have physical properties and an underlayment component which has at least one supplemental physical property for supplementing the physical properties of the first and second construction components. The construction components may or may not be secured together with the underlayment sandwiched between the second and first construction components to form a wall, ceiling, or floor assembly with the supplemental physical property or properties of the underlayment. The supplemental physical property or properties of the underlayment may include, but are not limited to, latent storage of thermal energy, sound transmission reduction, and/or burn through resistance.

16 Claims, 4 Drawing Sheets

PERFORMANCE ENHANCING UNDERLAYMENT, UNDERLAYMENT ASSEMBLY, AND METHOD

BACKGROUND OF THE INVENTION

The subject invention relates to an underlayment for supplementing one or more physical properties of: wall, ceiling, and floor construction components, especially conventional wall, ceiling, and floor construction components; to the wall, ceiling, and floor assemblies that include the underlayment; and to the method of fabricating and installing such assemblies on site.

Currently, the walls, ceilings, and floors of residential and commercial buildings are typically fabricated utilizing conventional wall, ceiling, and floor components. These conventional wall, ceiling, and floor construction components include: wall, ceiling, and floor construction boards such as but not limited to 4×8 foot gypsum boards, cement boards, and wood fiber boards (e.g. OSB boards (oriented strand boards), particle boards, and plywood); concrete block or cinderblock walls; decorative wall and ceiling construction components, such as but not limited to laminates with decorative surface layers (e.g. hardwood or simulated hardwood surface layers, fabric layers, etc.); and decorative floor construction components, such as but not limited to carpeting, cushioned carpeting, rugs, cushioned rugs, vinyl flooring, cushioned vinyl flooring, tiles, flexible or vinyl tiles, and flooring laminates with decorative surface layers (e.g. hardwood or simulated hardwood surface layers, tile or simulated tile surface layers, etc), which may be permanent floor construction components or unattached or readily removable floor components that overlie conventional permanent floor components. While walls, ceilings, and floors constructed with these conventional wall, ceiling, and floor construction components meet the basic requirements for residential and commercial walls, ceilings, and floors, certain applications arise where it is necessary or desirable to provide walls, ceilings, and/or floors with physical properties not provided by these conventional wall, ceiling and floor construction components or not provided by these conventional wall, ceiling, and floor construction components to the extent required or desired for the applications. Physical properties necessary or desirable for certain applications and not provided or only partially provided by these conventional wall, ceiling, and floor construction components may include, but are not limited to physical properties such as the latent storage of thermal energy, enhanced sound transmission reduction, water vapor transmission reduction, and/or enhanced burn through resistance. For example, it might be necessary or desirable to have the external walls of a living portion of a home or working areas of a commercial building or walls between the living portion of a home or working areas of a commercial building and an attached garage: that latently store thermal energy to maintain the living portion of the home or working areas of the commercial building at a more constant temperature and conserve energy; that, when compared to walls made of conventional wallboards, have greater sound transmission reduction; and/or that, when compared to walls made with conventional wallboards, have increased burn through resistance. It might also be necessary or desirable to have ceilings and/or floors of a home or commercial building that latently store thermal energy to maintain different living portions of the home or working areas of the commercial building at more constant temperatures and conserve energy; that, when compared to ceilings and/or floors made of conventional ceiling and floor components, have greater sound transmission reduction; and/or that, when compared to ceilings and/or floors made with conventional ceiling and floor components, have increased burn through resistance.

In addition to being able to supplement the physical properties (enhance the existing physical properties and/or add new physical properties) of conventional wall, ceiling, and/or floor construction components used in new building construction and enhance the performance of these construction components and the walls, ceilings, and/or floors made with these construction components, it would also be advantageous to be able to enhance the performance of walls, ceilings, and/or floors in existing building structures without having to remove the existing wall, ceiling, and/or floor construction components forming the walls, ceilings, and floors of these existing structures.

SUMMARY OF THE INVENTION

The subject invention provides an underlayment for supplementing one or more physical properties of wall, ceiling, and floor construction components and especially for supplementing one or more physical properties of conventional wall, ceiling, and floor construction components. This underlayment may be used to enhance the performance of walls, ceilings, and floors in the construction of new buildings and in the renovation of existing buildings without having to remove existing wall, ceiling, and/or floor construction components forming the walls, ceilings and/or floors of the existing buildings. The subject invention also includes the wall, ceiling, and floor assemblies that include the underlayment and the method of fabricating and installing such assemblies on site.

The underlayment of the subject invention exhibits one or more physical properties that can enhance the performance of walls, ceilings, and/or floors, especially walls, ceilings, and floors made with conventional wall, ceiling, and floor construction components. These wall, ceiling, and floor construction components include but are not limited to: wall, ceiling, and floor construction boards such as but not limited to 4×8 foot gypsum boards, cement boards, and wood fiber boards (e.g. OSB boards, particle boards, and plywood); concrete block and cinderblock walls; decorative wall and ceiling construction components, such as but not limited to laminates with decorative surface layers (e.g. hardwood or simulated hardwood surface layers, fabric layers, etc.); and decorative floor construction components, such as but not limited to carpeting, cushioned carpeting, rugs, cushioned rugs, vinyl flooring, cushioned vinyl flooring, tiles, flexible or vinyl tiles, and flooring laminates with decorative surface layers (e.g. hardwood or simulated hardwood surface layers, tile or simulated tile surface layers, etc.), which may be permanent floor construction components or unattached or readily removable floor construction components that overlie conventional permanent floor construction components.

The underlayment of the subject invention enhances one or more physical properties of these wall, ceiling, and floor construction components with which it is used by supplementing the physical properties of these wall, ceiling, and floor construction components. For example, when the underlayment of the subject invention is combined with a wall, ceiling, or floor component to form a wall, ceiling, or floor construction component/underlayment assembly, the underlayment can supplement the physical properties of the construction component by enhancing one or more existing physical properties of the construction component and/or by adding one or more new physical properties to those of the construction component. The supplemental physical properties imparted to a construction component/underlayment assembly by the underlayment of the subject invention include physical properties such as but not limited to the latent storage of thermal energy, enhanced sound transmission reduction, enhanced burn through resistance, enhanced water vapor transmission reduction, enhanced puncture resistance, and/or enhanced strength.

As discussed above, the underlayment of the subject invention enhances one or more physical properties of the wall, ceiling, or floor construction components with which it is used by supplementing the physical properties of these wall, ceiling, or floor construction components and the underlayment in combination with these construction components forms a construction component/underlayment assembly of the subject invention that exhibits these enhanced physical properties. In addition, where it is desired or required that the construction component/underlayment assembly of the subject invention exhibit certain physical properties, other than those supplemented by the underlayment, for a particular application and these other physical properties are met or exceeded by the wall, ceiling, or floor construction components of the assembly, it is also important to structure the underlayment of the subject invention so that the underlayment in combination with these construction components does not degrade the one or more other physical properties exhibited by these construction components or does not materially degrade the one or more other physical properties exhibited by these construction components to the extent the physical properties required by or desired for the application are no longer met or exceeded. With this underlayment structure, those other physical properties, which are significant to the particular application and exhibited by the construction components, will be met or exceeded by the construction component/underlayment assemblies of the subject invention. In other words, where the construction components with which the underlayment of the subject invention is used for a particular application, exhibit physical properties other than those supplemented by the underlayment to the degree desired or required for the particular application, the underlayment of the subject invention is preferably structured so that the underlayment in combination with the wall, ceiling, or floor components with which it is used form a construction component/underlayment assembly that meets or exceeds the desired or required performance criteria or characteristics for these other physical properties.

For example, some conventional or other construction components permit the passage of water vapor through the components at a given rate and for certain applications this rate of water vapor transmission through the components is a significant desired or required physical property of the application. For construction component/underlayment assemblies of the subject invention made with such construction components and used for applications where this property is significant to the performance of the assembly, the underlayment of the subject invention can have a permeability that permits the passage of water vapor through the underlayment so that the construction component/underlayment assembly meets or exceeds the desired or required water vapor permeability for the application (e.g. the underlayment has a water vapor permeability that is sufficiently great or that equals or exceeds the permeability of the construction components so that the overall permeability of the assembly meets or exceeds the permeability desired or required for the application).

In a first embodiment of the subject invention, the wall, ceiling, or floor construction component/underlayment assembly of the subject invention for use in a wall, ceiling, or floor construction includes: first and second wall, ceiling, or floor construction components which each have physical properties and the underlayment component which has at least one supplemental physical property for supplementing the physical properties of the first and second wall, ceiling, or floor construction components. The components of this construction component/underlayment assembly are permanently affixed to each other for the service life of the assembly. The first and second wall, ceiling, or floor construction components of this construction component/underlayment assembly of the subject invention may have the same or different physical properties and may be made from the same type of construction component or a different type of construction component. For example, the assembly may include first and second construction components that are each wall, ceiling, or floor construction boards. The assembly may include first and second construction components where one construction component is a wall, ceiling, or floor construction board and the second construction component is a decorative wall, ceiling, or floor construction component. The first and second construction components are permanently secured to each other with the underlayment component sandwiched between the first and second construction components to form a wall, ceiling, or floor construction component/underlayment assembly with the supplemental physical property or properties of the underlayment.

With regard to this first embodiment of the subject invention, preferably, the underlayment component is first secured, e.g. with an adhesive or mechanical fasteners such as staples, to one of the construction components and the construction components are then permanently secured to each other to form the construction component/underlayment assembly. Typically, one of the construction components is already secured to structural members of a wall, ceiling, or floor that may be a wall, ceiling or floor of a building under construction or under renovation. However, fasteners securing the first and second construction components together can also be used to secure the underlayment component to the construction components and/or to secure the entire construction component/underlayment assembly to structural members of the wall, ceiling, or floor.

In a second embodiment of the subject invention, a floor construction component/underlayment assembly of the subject invention for use in floor construction includes: first and second floor construction components which each have physical properties and the underlayment component which has at least one supplemental physical property for supplementing the physical properties of the first and second floor construction components. However, unlike the components of the first embodiment of the construction component/underlayment assembly of the subject invention, the components of this construction component/underlayment assembly are not permanently affixed to each other for the service life of the assembly. The first and second floor construction components of this embodiment of the construction component/underlayment assembly of the subject invention typically have different physical properties and are typically made from different types of construction components. For example, the assembly typically includes a first construction component that is a floor construction board or other permanent floor construction component and a second construction component that is a decorative floor construction component that overlies but is unattached to or readily removable from over the first construction component. Such decorative floor construction components include but are not limited to carpeting, cushioned carpeting, rugs, cushioned rugs, vinyl flooring, cushioned vinyl flooring, tiles, flexible or vinyl tiles, and flooring laminates with decorative surface layers (e.g.

hardwood or simulated hardwood surface layers, tile or simulated tile surface layers, etc). The underlayment is sandwiched between the first and second floor construction components to form a floor construction component/underlayment assembly with the supplemental physical property or properties of the underlayment component.

With regard to this second embodiment of the subject invention, preferably, either the underlayment component is laid over the construction board component(s) or other permanent floor construction component(s) and then the decorative floor construction component is laid over the underlayment component or the underlayment component and the decorative floor construction component are an integral subassembly that is laid over the construction board component(s) or other permanent floor construction component(s). Where the underlayment component, the underlayment component and the decorative floor construction component, or the underlayment component and decorative floor construction component subassembly are held in place over the floor construction board component(s) or other permanent floor construction component(s) primarily by gravity or only by gravity, the underlayment component, the decorative floor construction component, or the underlayment component and the decorative floor construction component subassembly can be easily removed from the floor construction board component(s) or other permanent floor construction component(s) without damaging the underlayment component, the decorative floor construction component, or the underlayment component and the decorative floor construction component subassembly or the permanent floor construction component(s). Where the underlayment component, the underlayment component and the decorative floor construction component, or the underlayment component and decorative floor construction component subassembly are secured to the floor construction board component(s) or other permanent floor construction component(s), the underlayment component, the underlayment component and the decorative floor construction component, or the underlayment component and decorative floor construction component subassembly are removably secured with an adhesive, staples, or other fastening means that enables the underlayment component, the decorative floor construction component, or the underlayment component and the decorative floor construction component subassembly to be easily removed from the floor construction board component(s) or other floor construction component(s).

The underlayment of the subject invention and the construction component/underlayment assemblies of the subject invention that can be made incorporating the underlayment of the subject invention could provide contractors with great flexibility and cost savings. By utilizing the underlayment of the subject invention, contractors would only need to stock and utilize standard relatively low cost construction components when constructing or renovating buildings. Where select portions of a building require construction components with physical properties that are not provided by standard construction components, rather than having to purchase and stock relatively expensive construction components to meet these application requirements, the contractors could utilize construction component/underlayment assemblies of the subject invention that are made with standard building components. For example, in multi-occupant buildings such as apartment buildings, the walls separating the rooms of an apartment typically can be constructed with standard gypsum board. However, the walls between apartments typically must meet fire rating standards that are not achieved when utilizing only standard gypsum board in the wall construction. With the on site fabrication of construction component/underlayment assemblies of the subject invention, which are made with standard gypsum board and an underlayment that provides supplemental burn through resistance, and the use these assemblies to form the walls between apartments, contractors would not have to purchase and stock the relatively expensive fire rated wall board products normally used to construct walls between apartments. At the same time, through the use of an underlayment in these assemblies that also provides supplemental storage of latent heat and/or sound transmission reduction, the walls could be provided with additional performance enhancing properties.

DESCRIPTION OF THE PREFERRED EMBODIMENTS

The underlayment 20 of the subject invention is disposed between two construction components, especially conventional (standard) wall, ceiling and floor construction components and typically is adhesively bonded or secured to two construction components to form construction component/underlayment assemblies. These wall, ceiling, and floor construction components include but are not limited to: wall, ceiling, and floor construction boards such as but not limited to 4×8 foot gypsum boards, cement boards, and wood fiber boards (e.g. OSB boards, particle boards, and plywood); concrete block and cinderblock walls; decorative wall and ceiling construction components, such as but not limited to laminates with decorative surface layers (e.g. hardwood or simulated hardwood surface layers, fabric layers, etc.); and decorative floor construction components, such as but not limited to carpeting, cushioned carpeting, rugs, cushioned rugs, vinyl flooring, cushioned vinyl flooring, tiles, flexible or vinyl tiles, and flooring laminates with decorative surface layers (e.g. hardwood or simulated hardwood surface layers, tile or simulated tile surface layers, etc.) which may be permanent floor construction components or unattached or readily removable floor construction components that overlie conventional permanent floor construction components. The construction component/underlayment assemblies have supplemental physical properties provided by the underlayment 20 that are not present in the construction components of the assemblies such as but not limited to the latent storage of thermal energy and/or have supplemental physical properties provided by the underlayment 20 that enhance the physical properties of the construction components of the assemblies such as but not limited to enhanced sound transmission reduction, burn through resistance, water vapor transmission reduction, puncture resistance, and/or strength.

As discussed above, the underlayment 20 enhances one or more physical properties of the wall, ceiling, or floor construction components with which it is used by supplementing the physical properties of these wall, ceiling, or floor construction components and the underlayment in combination with these construction components forms a construction component/underlayment assembly that exhibits these enhanced physical properties. In addition, where it is desired or required that the construction component/underlayment assembly exhibit certain physical properties, other than those supplemented by the underlayment 20, for a particular application and these other physical properties are met or exceeded by the wall, ceiling, or floor construction components of the assembly, it is also important to structure the underlayment 20 so that the underlayment in combination with these construction components does not degrade the one or more other physical properties exhibited by these construction components or does not materially degrade the one or more other physical properties exhibited by these construction components to the extent the physical properties required by or desired for the application are no longer met or exceeded. With this underlayment structure, those other physical properties, which are significant to the particular application and exhibited by the construction components, will be met or exceeded by the construction component/underlayment assemblies. In other words, where the construction components with which the underlayment 20 is used for a particular application, exhibit physical properties other than those supplemented by the underlayment to the degree desired or required for the particular application, the underlayment 20 is preferably structured so that the underlayment in combination with the wall, ceiling, or floor components with which the underlayment is used form a construction component/underlayment assembly that meets or exceeds the desired or required performance criteria or characteristics for these other physical properties.

Figure 2A:
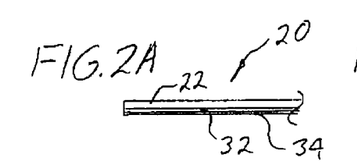
FIG. 2A to 2C are partial side views of three different embodiments of the underlayment of the subject invention to schematically show three different underlayment structures of the subject invention with an adhesive layer and release sheet on one major surface.
Figures 2B, 2C:
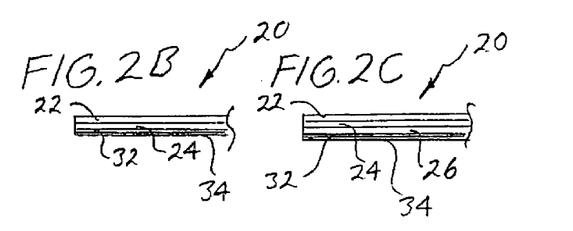

As schematically shown in FIGS. 2A to 2C, the underlayment 20 preferably includes one, two, or three layers 22, 24, and 26 that provide supplemental physical properties but could include more layers. Preferably, the underlayment 20 is a single layer, such as the underlayment of FIG. 2A and that single layer provides two or more supplemental physical properties. Where the underlayment 20 includes more than one layer, preferably, the layers are bonded or otherwise laminated together so that the underlayment can be applied to a major surface of a construction component in a single operation. Where the underlayment 20 has multiple layers, such as layers 22, 24, and 26, each layer may each exhibit a different supplemental physical property such as but not limited to the latent storage of thermal energy, sound transmission reduction, water vapor transmission reduction, burn through resistance, puncture resistance, or any one or more of the layers may exhibit two or more supplemental physical properties such as but not limited to the latent storage of thermal energy and burn through resistance, the latent storage of thermal energy and sound transmission reduction, sound transmission reduction and burn through resistance, burn through resistance and puncture resistance, etc.

Figure 1:
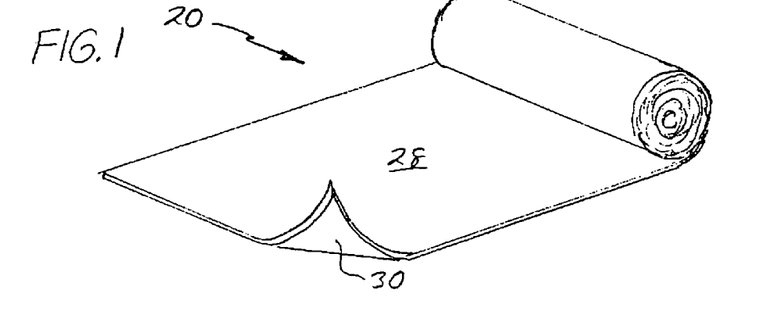
FIG. 1 is a schematic perspective view of an underlayment roll good of the subject invention.

Preferably, the underlayment 20 of the subject invention is flexible or pliable, such as the embodiment shown in FIG. 1, so that the underlayment can be packaged, stored, shipped, and handled in roll form. The underlayment 20 has first and second major surfaces 28 and 30 that are each defined by the length and the width of the underlayment.

The underlayment 20 may be provided in different lengths, but would typically be at least 24 feet in length. As a practical matter, when the underlayment 20 is provided in roll form, the length of the underlayment 20 is only limited by the size and weight of the roll, which should have a size and weight that facilitates the packaging, storage, shipment, handling, and application of the underlayment. Preferably, the underlayment 20 can be easily severed to desired lengths at the job site with a knife or other conventional cutting tool for application to wall, ceiling, and/or floor construction components and/or may be transversely separable by hand e.g. through the use of longitudinally spaced-apart transverse lines of weakness (such as but not limited to lines of perforations) that are located a standard eight feet or some other standard construction board dimension apart along the length of the underlayment.

The underlayment 20 may be provided in different widths with the underlayment typically being between about 1.5 feet and about 9 feet in width. For ease of packaging, storage, shipping, handling, and application, it is preferred to have an underlayment 20 that is between about 1.5 and about 5 feet in width. However, for applications where the underlayment 20 is to be applied to a series of construction boards, such as but not limited to wall boards, it may be beneficial to have an underlayment about 8 feet to about 10 feet in width so that the underlayment could be applied in one continuous operation from floor to ceiling over a plurality of wall boards such as the wall boards of an entire wall. The underlayment 20 may have in different thicknesses with the thickness of the underlayment typically being between about 0.015 inches and about 1 inch and preferably being between about 0.015 and about 0.375 inches.

In one preferred embodiment of the invention, one major surface of the underlayment 20 has an adhesive 32 (e.g. a pressure sensitive or rewettable adhesive) thereon so that the underlayment can be easily and quickly secured to one of the construction components of a wall, ceiling, or floor construction component/underlayment assembly as the assembly is being fabricated on site. Preferably, the underlayment 20 is a self-adhering underlayment and the adhesive 32 is a pressure sensitive adhesive that is overlaid, until application, by a release sheet 34 that is surface treated with silicone or another suitable release agent and protects the adhesive from degradation prior to application. The adhesive 32 may be a continuous coating that is substantially coextensive with the major surface of the underlayment 20 or may be discontinuous (e.g. spaced apart lines of adhesive, dots of adhesive, etc.) and both major surfaces of the underlayment 20 may have an adhesive thereon for bonding the underlayment 20 to both of construction components. FIGS. 2A to 2C show an adhesive coating 32 and a release sheet 34 on one major surface of each of these embodiments of underlayment 20.

Where it is desired to passively absorb and store excessive heat during a certain period (e.g. the day) and discharge heat during another period (e.g. the night) to maintain a more constant temperature within a building or room and conserve energy, an underlayment 20 can be used in the construction component/underlayment assembly that latently stores and releases thermal energy. The phase change material 38 utilized in such an underlayment absorbs energy (heat) during a melting cycle (fusion cycle) of the phase change material where the phase change material physically changes from a solid or crystalline form to a liquid form at a nearly constant temperature within the temperature range of about 65° F. (18° C.) to about 80° F. (27° C.) and releases energy (heat) during a solidification or crystallization cycle where the phase change material physically changes from a liquid to a solid or crystalline form at a nearly constant temperature within the temperature range of about 65° F. (18° C.) to about 80° F. (27° C.). Due to the small volume increase and low vapor pressure exhibited when phase change materials physically change from a solid to a liquid, a phase change material is used in the underlayment 20 that undergoes a solid to liquid phase change within this temperature range rather than a liquid to gas phase change which would result in a huge volume increase. Paraffin waxes and other commercially available phase change materials may be used in the underlayment 20 that undergo solid to liquid and liquid to solid phase changes within the above temperature range and have a latent heat storage capacity of at least 160 J/g and preferably at least 180 J/g. The particular phase change material selected for the underlayment 20 is selected in part for having its phase change occur at a desired temperature within the temperature range set forth above in this paragraph.

FIGS. 3A to 3E show different ways of incorporating the phase change material 38 into the underlayment 20. The phase change material can be incorporated into the underlayment 20 as the sole layer of the underlayment or as one or more of a plurality of layers in the underlayment. Preferably, the phase change material, when in liquid form, is prevented or substantially prevented from migrating within the layer so that the phase change material substantially retains its initial distribution within the layer through repeated phase changes between a solid and liquid form regardless of the orientation of the underlayment.

Figure 3A:
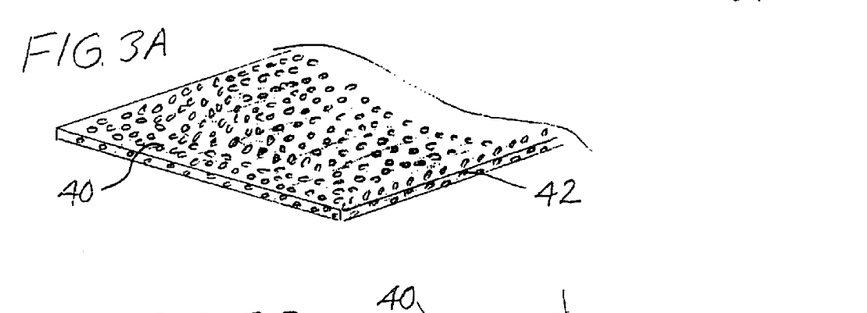
FIG. 3A is a partial perspective view of a flexible phase change material underlayment layer of the subject invention schematically showing a fibrous mat having microcapsules of phase change material that are dispersed throughout (preferably, uniformly dispersed throughout) and bonded to the fibrous mat.
Figure 3B:
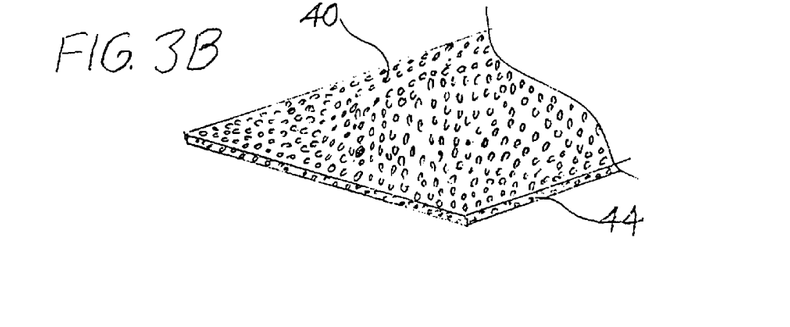
FIG. 3B is a partial perspective view of a flexible phase change material underlayment layer of the subject invention schematically showing a polymeric layer having microcapsules of phase change material that are dispersed throughout (preferably uniformly dispersed throughout) and bonded to the polymeric layer.

In the embodiments shown in FIGS. 3A and 3B, the phase change material 38 (not shown in these figures) is encapsulated within microcapsules 40 having shells that are preferably filled or substantially filled with the phase change material and are typically about 5 to 10 mm in diameter. The microcapsule shells are impervious to the phase change material in its liquid form, are not degraded by the phase change material, and can withstand the phase changes of the phase change material (including the volume increases that occur during the melting cycle) without leaking.

In the embodiment of FIG. 3A, the microcapsules 40 of phase change material are dispersed throughout (preferably, uniformly or substantially uniformly throughout) and bonded to the fibers of a flexible or pliable woven or nonwoven fibrous mat layer 42 and retain their initial distribution throughout the mat layer regardless of the orientation of the underlayment. While the fibrous mat layer 42 is preferably made of glass fibers, the fibrous mat may be made of other fibers such as but not limited to polyester, polypropylene, and spunbond fibers; blends of two or more of such fibers; and blends any one or more of such fibers and glass fibers.

In the embodiment of FIG. 3B, the microcapsules 40 of phase change material are dispersed throughout (preferably, uniformly or substantially uniformly throughout) and bonded to a polymeric material, which may be a polymeric foam material, forming a flexible or pliable polymeric layer 44 and retain their initial distribution throughout the layer regardless of the orientation of the underlayment. While the polymeric layer 44 is preferably made of foamed polyurethane and may or may not contain fire retardants and/or other desired additives, the polymeric layer 44 may be made of other polymeric materials such as but not limited to foamed polyvinyl chloride, latex, extruded or expanded polystyrene, which may or may not contain fire retardants and/or other desired additives.

Figure 3C:
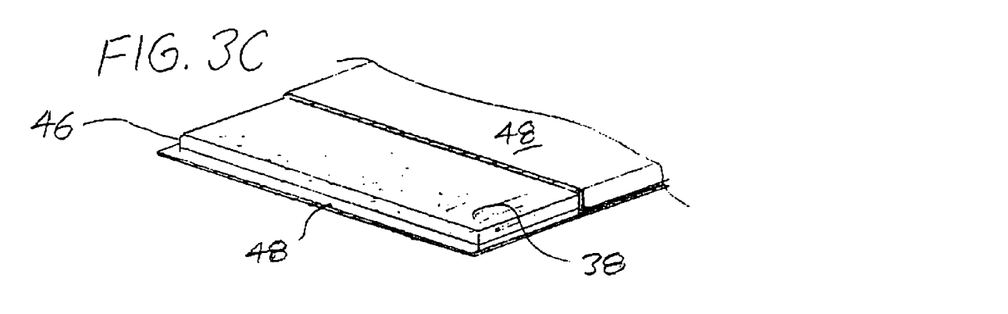
FIG. 3C is a partial perspective view, with portions broken away, of a flexible phase change material underlayment layer of the subject invention schematically showing a fibrous mat that is saturated with a phase change material and encapsulated within a flexible polymeric film envelope that is impermeable to the phase change material in liquid form.

In the embodiment shown in FIG. 3C, a flexible woven or nonwoven fibrous mat 46 is saturated or coated with the phase change material 38 (preferably uniformly or substantially uniformly saturated or coated with the phase change material 38) and the mat and phase change material are encapsulated (completely enclosed) within a flexible polymeric film envelope 48 that is impermeable to the phase change material in liquid form. Preferably, the viscosity of the phase change material in its liquid form, the fiber density of the mat, and the enclosure of the mat and phase change material within the envelope function to prevent or substantially prevent the migration of the phase change material in liquid form and maintain or substantially maintain the original distribution of the phase change material within the envelope regardless of the orientation of the underlayment. While the fibrous mat 46 is preferably made of glass fibers, the fibrous mat may be made of other fibers such as but not limited to polyester, polypropylene, and spunbond fibers; blends of two or more of such fibers; and blends any one or more of such fibers and glass fibers. While the flexible polymeric film envelope 48 is preferably made of coextruded polyethylene (e.g. two layers where one layer has a higher temperature softening point than the other layer so that the envelope is self sealing on one major surface through the application of heat or three layers where the middle layer has a higher temperature softening point than the two outer layers so that the envelope is self sealing on both major surfaces through the application of heat) and may or may not contain fire retardants and/or other desired additives, the polymeric film envelope 48 may be made of other polymeric materials such as but not limited to polyester, which may or may not contain fire retardants and/or other desired additives.

It is contemplated that the embodiment of FIG. 3C can be made on an in-line production operation wherein following the curing of the binder in the fibrous mat 46, a molten phase change material would be applied to the mat by means of a curtain coater or other suitable coating mechanism. Following the coating of the fibrous mat, the coated mat would be passed through a film laminator where the coated mat would be encapsulated within a polymeric film envelope 48 formed in the laminator. Preferably, the polymeric film material of the envelope would be resealable (e.g. heat sealable) after an underlayment incorporating this embodiment is cut to length at a job site for application.

Figure 3D:
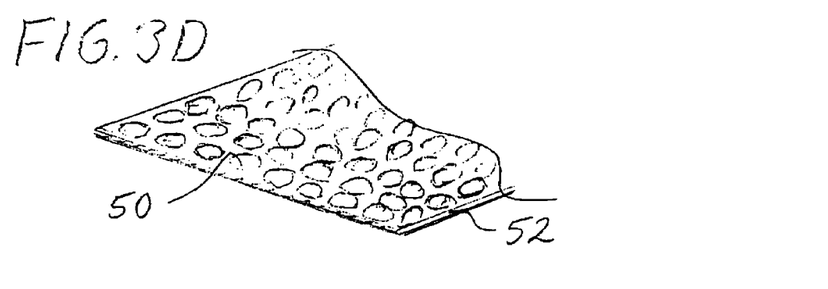
FIG. 3D is a partial perspective view of a flexible phase change material underlayment layer of the subject invention schematically showing a phase change material macro-encapsulated within bubbles of a polymeric film envelope that is impermeable to the phase change material in liquid form.

In the embodiment of FIG. 3D, the phase change material 38 (not shown) is contained within a plurality of discrete, semi-spherical or substantially semi-spherical chambers 50 that preferably have a uniform distribution that is substantially coextensive with a major surface of a flexible polymeric sheet material 52, such as or similar to a "Bubble Wrap®" material. While, as shown, the chambers 50 are semi-spherical chambers, the chambers may be spherical or substantially spherical or may have elliptical, substantially elliptical, or other cross sectional configurations. Preferably, the chambers 50 are filled or substantially filled with the phase change material 38. The chambers 50 are impervious to the phase change material in its liquid form, are not degraded by the phase change material, and can withstand the phase changes of the phase change material (including the volume increases that occur during the melting cycle) without leaking. With its containment within the discrete chambers 50, the phase change material 38 retains its initial distribution throughout the layer regardless of the orientation of the underlayment. While the flexible polymeric film sheet material 52 is preferably made of coextruded polyethylene (e.g. two layers where one layer has a higher temperature softening point than the other layer so that the envelope is self sealing on one major surface through the application of heat or three layers where the middle layer has a higher temperature softening point than the two outer layers so that the envelope is self sealing on both major surfaces through the application of heat) and may or may not contain fire retardants and/or other desired additives, the polymeric film sheet material 52 may be made of other polymeric materials such as but not limited to polyester, which may or may not contain fire retardants and/or other desired additives.

Figure 3E:
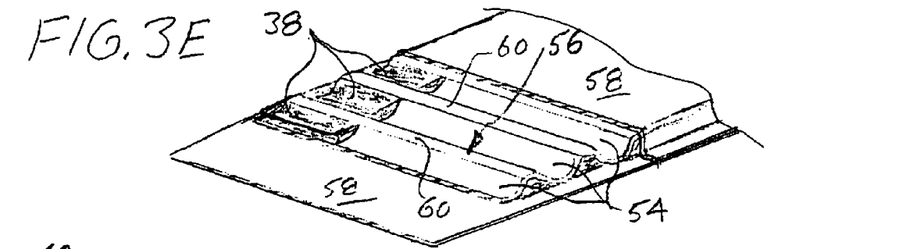
FIG. 3E is a partial perspective view of a flexible phase change material underlayment layer of the subject invention, with portions broken away, schematically showing a corrugated divider encapsulated within and preferably bonded to a flexible polymeric film envelope to form chambers within the envelope that contain a phase change material wherein the corrugated divider and polymeric film envelope are both impervious to the phase change material in liquid form.

In the embodiment of FIG. 3E, the phase change material 38 is contained within a plurality of discrete, elongated chambers 54 formed by a corrugated sheet 56 that is encapsulated within a flexible polymeric film envelope 58. Preferably, the chambers 54 are filled or substantially filled with the phase change material. The corrugations extend perpendicular to the longitudinal centerline of the polymeric film envelope 58 and preferably are bonded to the envelope along the apexes 60 of the corrugations and at the ends of the corrugations to seal the phase change material 38 within the discrete chambers 54 and maintain or substantially maintain original distribution of the phase change material within the envelope regardless of the orientation of the underlayment. The chambers 54 formed by the corrugated sheet 56 and the envelope 58 are impervious to the phase change material 38 in its liquid form, are not degraded by the phase change material, and can withstand the phase changes of the phase change material (including the volume increases that occur during the melting cycle) without leaking. While the flexible polymeric film sheet material forming the corrugated sheet 56 and the envelope 58 is preferably made of coextruded polyethylene (e.g. two layers where one layer has a higher temperature softening point than the other layer so that the envelope is self sealing on one major surface through the application of heat or three layers where the middle layer has a higher temperature softening point than the two outer layers so that the envelope is self sealing on both major surfaces through the application of heat) and may or may not contain fire retardants and/or other desired additives, this polymeric film sheet material may be made of other polymeric materials such as but not limited to polyester, which may or may not contain fire retardants and/or other desired additives.

Where it is desired to reduce sound transmission through a wall, ceiling, and/or floor, an underlayment 20 can be used in the construction component/underlayment assembly of the subject invention that is or includes one or more layers of sound-deadening material. The preferred sound deadening material for such a sound control underlayment has a Young's Modulus (bulk modulus of elasticity) between 50 and 600 pounds per square inch, a value much lower than the stiffness values associated with conventional construction boards and materials used in building wall, ceiling and floor assemblies, e.g. gypsum boards, cement boards, wood fiber boards (e.g. OSB boards, particle boards, and plywood), and wooden studs and joists. Such materials are described in U.S. Pat. No. 6,758,305 B2, issued Jul. 6, 2004, which is incorporated herein by reference in its entirety. Modeling and testing has shown that materials with a Young's Modulus (bulk modulus of elasticity) between 50 and 500 pounds per square inch offer broadband improvements with a maximum of 6 to 8 dB improvement at the 1600 Hz one-third octave band. Materials with a Young's Modulus (bulk modulus of elasticity) between 500 and 600 pounds per square inch were found to offer broadband improvements with a maximum of 3 to 4 dB improvement at the 1600 Hz one-third octave band. Therefore, sound-deadening materials having a Young's Modulus within the lower described range offer the best sound control performance while materials with a Young's Modulus within the higher described range offer some improvement in terms of the reduction of sound transmission. While the above-discussed sound-deadening materials are preferred, any material with a Young's Modulus less than the Young's Modulus of the construction components of the construction component/underlayment assembly may be used in the subject invention as a sound-deadening material. It is contemplated that the sound-deadening material can be any one of various materials including a foam material, such as polyurethane foam or a viscoelastic material such as EPDM rubber or latex.

Figure 3F:
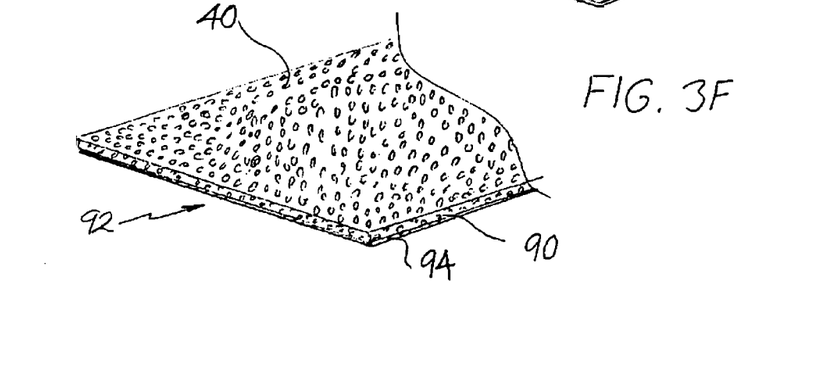
FIG. 3F is a partial perspective view of a flexible phase change material and sound deadening material underlayment layer of the subject invention schematically showing a polymeric foam layer having microcapsules of phase change material that are dispersed throughout (preferably uniformly dispersed throughout) and bonded to the polymeric foam layer and a scrim bonded to one major surface of the polymeric foam layer.

FIG. 3F shows a way of incorporating the phase change material 38 and a sound deadening material into the underlayment 20 in a single reinforced layer that may be the sole layer of the underlayment. As shown in FIG. 3F, microcapsules 40 of phase change material are dispersed throughout (preferably, uniformly or substantially uniformly throughout) and bonded to a polymeric foam material 90 to form a flexible or pliable layer 92 that retains the initial distribution of the microcapsules 40 throughout the layer regardless of the orientation of the underlayment. Preferably, this underlayment 20 has a Young's Modulus (bulk modulus of elasticity) between 50 and 200 pounds per square inch. Preferably, the polymeric foam material 90 is a foamed polyurethane, which may or may not contain fire retardants and/or other desired additives, the layer 92 is between 40% and 60% by weight microcapsules 40 and between 40% and 60% by weight foam, and the layer 92 is reinforced with a scrim 94 (e.g. a 0.25 inch×0.25 inch glass fiber scrim) that is bonded to one of the major surfaces of the layer 92. While this embodiment of the underlayment 20 may be used for other applications, this embodiment of the underlayment 20 is particularly well suited for use as an underlayment in a construction component/underlayment assembly that includes a decorative floor construction component such as but not limited to carpeting, rugs, vinyl flooring, tiles, flexible or vinyl tiles, and flooring laminates with decorative surface layers (e.g. hardwood or simulated hardwood surface layers, tile or simulated tile surface layers, etc.).

Where it is desired to increase the burn through resistance of a wall, ceiling, and/or floor, an underlayment 20 can be used in the construction component/underlayment assembly of the subject invention that is or includes one or more layers of burn through resistant material(s). One preferred embodiment of the burn through resistant layer of the present invention comprises a sheet of burn through resistant paper made of aramid fibers, mica flakes, and aramid fibril binder that contains between 30% and 50% by weight mica flakes and, typically, between 25% and 35% by weight aramid fibers and between 25% and 35% aramid fibril binder. The paper sheet may have a scrim layer incorporated into or bonded the paper to add strength and puncture and tear resistance to the underlayment 20. While the above discussed burn through resistant materials are preferred, any burn through resistant material (e.g. sheets of glass fibers, Nextel® fibers, and/or high temperature resistant mineral wool fibers, fire blockers for airplane seat cushions) that will significantly increase the burn through resistance of the construction component/underlayment assembly compared to the burn through resistance of the construction components of the construction component/underlayment assembly may be used in the subject invention as a burn through resistant material.

Where the underlayment 20 is used with conventional or other construction components that permit the passage of water vapor through the components at a given rate (e.g. have a water vapor permeance rating of about 5 perms or greater) and this rate or a lesser acceptable rate of water vapor transmission through the components is a significant desired or required physical property of the application, the underlayment 20 can be structured so that the construction component/underlayment assembly formed by these components meets the given rate or the lesser acceptable rate (e.g. the underlayment has a water vapor permeability that is sufficiently great or that equals or exceeds the permeability of the construction components so that the overall permeability of the assembly meets or exceeds the permeability desired or required for the application). An underlayment 20 with a water vapor permeance rating of about 5 perms or greater meets or exceeds the permeability requirement for many applications.

Where the underlayment 20 is used with conventional or other construction components that permit the passage of water vapor through the components at a given rate (e.g. have a water vapor permeance rating of about 5 perms or greater) and for a particular application, this rate of water vapor transmission through the components is unacceptable, the underlayment 20 can be structured so that the construction component/underlayment assembly formed by the underlayment and these components has a permeability that is less than that of the construction components and meets the permeability requirements for the application. An underlayment 20 with a water vapor permeance rating of about 1 perm or less typically meets the requirements for such applications.

Figure 4:
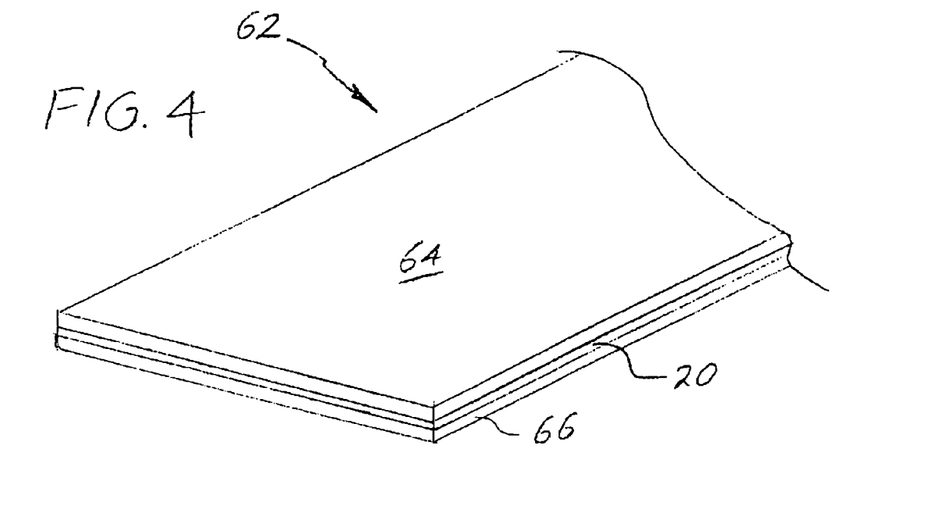
FIG. 4 is a partial schematic perspective view of a construction component/underlayment assembly of the subject invention.

As schematically shown in FIG. 4, the construction component/underlayment assembly 62 of the subject invention includes an underlayment 20, having one or more supplemental physical properties, that is located between and may be unsecured to or bonded or otherwise secured to two construction components 64 and 66. The construction components 64 and 66 may have the same or different physical properties and may be made from the same or different materials. Typically, the construction components 64 and 66 are standard construction components used in the building industry. These wall, ceiling, and floor construction components include but are not limited to: wall, ceiling, and floor construction boards such as but not limited to 4×8 foot gypsum boards, cement boards, and wood fiber boards (e.g. OSB boards, particle boards, and plywood); concrete block and cinderblock walls; decorative wall and ceiling construction components, such as but not limited to laminates with decorative surface layers (e.g. hardwood or simulated hardwood surface layers, fabric layers, etc.); and decorative floor construction components, such as but not limited to carpeting, cushioned carpeting, rugs, cushioned rugs, vinyl flooring, cushioned vinyl flooring, tiles, flexible or vinyl tiles, and flooring laminates with decorative surface layers (e.g. hardwood or simulated hardwood surface layers, tile or simulated tile surface layers, etc.), which may be permanent floor construction components or unattached or readily removable floor construction components that overlie conventional permanent floor construction components.

Figure 5:
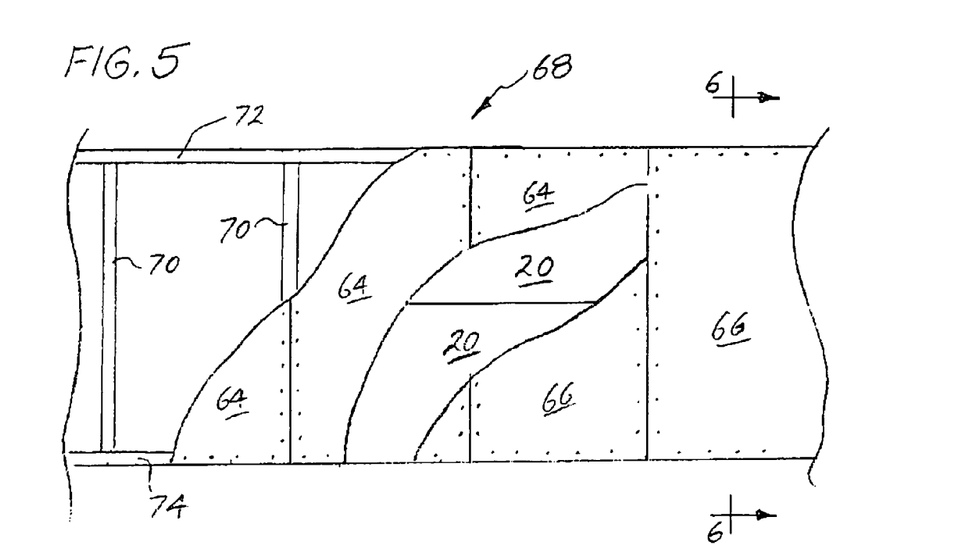
FIG. 5 is a schematic elevation of a wall structure utilizing construction component/underlayment assemblies of the subject invention with portions broken away to show different layers of the assemblies and the support structure.
Figure 6:
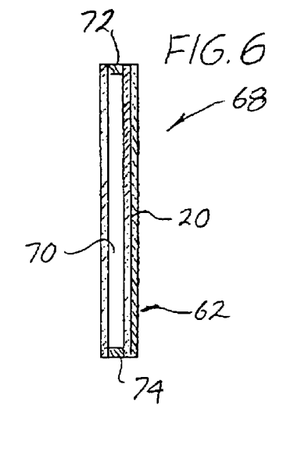
FIG. 6 is a vertical schematic cross section of the wall of FIG. 5 taken substantially along lines 6-6 of FIG. 5.

Preferably, the construction component/underlayment assembly 62 is fabricated at the job site and may be used to enhance the performance of walls, ceilings, and/or floors in both new building construction and the upgrading of existing building structures. FIGS. 5 and 6 show a wall 68 constructed with construction component/underlayment assemblies 62 wherein the construction components are construction boards. Preferably, the wall 68 is constructed by first securing a first layer of construction boards 64 to the studs 70, top plate 72, and sole plate 74 of the wall with nails, screws and/or adhesive. A layer of underlayment(s) 20 is then bonded, stapled or otherwise secured to a major surface of the construction boards 64. The underlayments 20 can be applied in vertically extending strips (e.g. strips extending from floor to ceiling) that preferably are between about 1.5 and about 4 feet wide and the height of the wall 68. When the strips of underlayment 20 are applied in a vertical direction, these vertically extending strips of the underlayment 20 may abut or overlap adjacent strips of the underlayment so that the underlayments form a layer within the wall 68 that is coextensive or substantially coextensive with the first layer of construction boards 64. The underlayments 20 can also be applied in horizontally extending strips (e.g. strips extending for part or all of the length of the wall) that preferably are between about 1.5 and about 5 feet wide and have a length to overlay at least two construction boards 64 and preferably all of the construction boards 64 of the wall 68. When the strips of underlayment 20 are applied in a horizontal direction, these horizontally extending strips of the underlayment 20 may abut or overlap adjacent strips of the underlayment so that the underlayments form a layer within the wall 68 that is coextensive or substantially coextensive with the first layer of construction boards 64 and thus the wall 68. The construction boards 66 of the second layer of construction boards are then secured to the studs 70, top plate 72, and sole plate 74 with nails or screws to complete the fabrication of the construction component/underlayment assemblies 62 and the wall 68 or, where the application will permit, the construction boards 66 are then bonded to the underlayment 20 to complete the fabrication of the construction component/underlayment assemblies 62 and the wall 68. The wall 68 may then be taped, mudded and finished, e.g. with texture or paint.

Figures 7, 8:
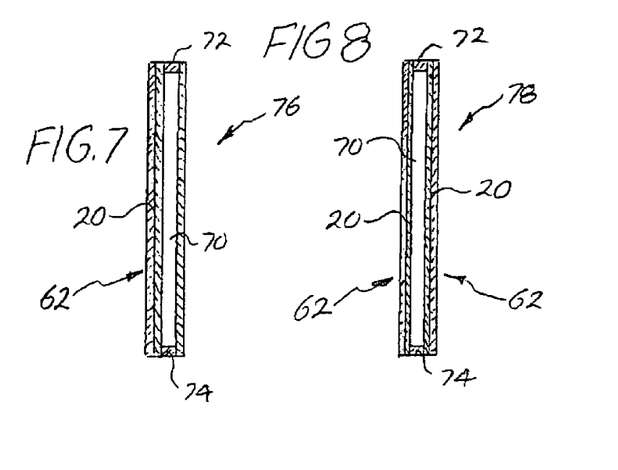
FIGS. 7 and 8 are schematic cross sections corresponding to the cross section of FIG. 6 and showing two additional wall structures utilizing the construction component/underlayment assemblies of the subject invention.

FIG. 7 shows an exterior wall 76 where the construction component/underlayment assemblies 62 form the exterior side of the wall. FIG. 8 shows an exterior or interior wall 78 where the construction component/underlayment assemblies 62 are used to form both sides of the wall.

While the on site fabrication of the construction component/underlayment assemblies 62 has been described in connection with walls 68, 76, and 78, the fabrication of construction component/underlayment assemblies 62 of a floor and/or ceiling would be the same with the strips of underlayment 20 extending lengthwise or widthwise of the construction boards and abutting or overlapping to form a layer within the floor and/or ceiling that is coextensive with or substantially coextensive with the floor and/or ceiling.

Figure 9:
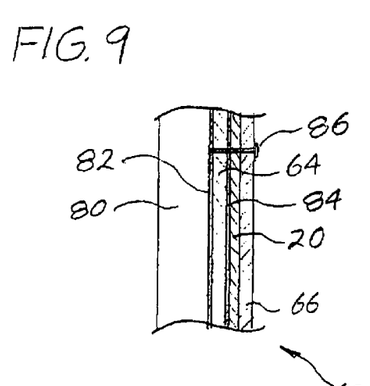
FIG. 9 is a schematic detail showing mechanical fasteners and adhesives securing the construction components and the underlayment of a construction component/underlayment assembly together and to a structural support member.
Figure 10:
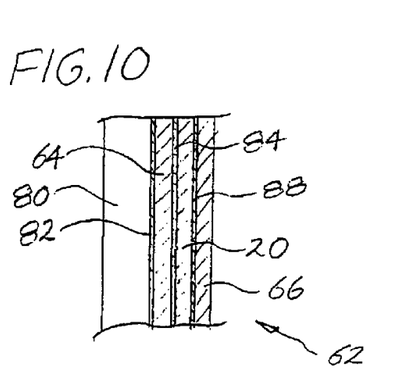
FIG. 10 is a schematic detail showing adhesives securing the construction components and the underlayment of a construction component/underlayment assembly together and to a structural support member.

FIG. 9 shows a detail of a construction component/underlayment assembly 62 wherein the construction board 64 is adhesively bonded to a structural support member 80 (e.g. a stud or joist) by an adhesive layer 82, the underlayment 20 is adhesively secured to the construction board 64 by an adhesive layer 84, and the construction board 66 is secured to the structural support member 80, the construction board 64, and the underlayment 20 by nails, screws or other mechanical fasteners 86. FIG. 10 shows a detail of a construction component/underlayment assembly 62 wherein the construction board 64 is adhesively bonded to a structural support member 80 (e.g. a stud or joist) by an adhesive layer 82, the underlayment 20 is adhesively secured to the construction board 64 by an adhesive layer 84, and the construction board 66 is adhesively secured to the underlayment 20 and thus the construction board 64 and the structural support member 80 by an adhesive layer 88.

Figure 11:
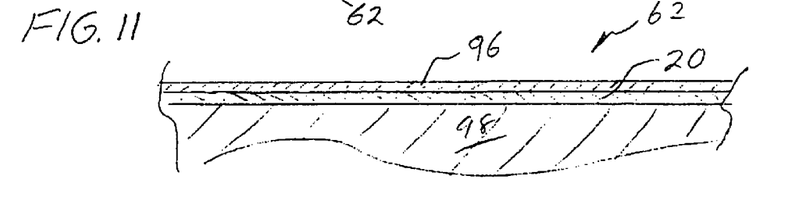
FIG. 11 is a partial vertical schematic cross section through a floor construction component/underlayment assembly of the subject invention.

FIG. 11 shows a construction component/underlayment assembly 62 that includes: a) a decorative floor construction component 96, such as but not limited to carpeting, cushioned carpeting, rugs, cushioned rugs, vinyl flooring, cushioned vinyl flooring, tiles, flexible or vinyl tiles, and flooring laminates with decorative surface layers (e.g. hardwood or simulated hardwood surface layers, tile or simulated tile surface layers, etc.), which overlies and may be permanently attached to a second permanent floor construction component (e.g. cement or wood fiber floor construction boards or other permanent floor construction components) or unattached to or readily separable and removable from a second permanent floor construction component; b) a permanent floor construction component 98 (e.g. cement or wood fiber floor construction boards or other permanent floor construction components); and c) an underlayment 20 between the construction components 96 and 98. The underlayment 20 may be adhesively or otherwise secured to one or both of the construction components 96 and 98 or unsecured to the construction components 96 and 98.

The decorative floor construction component 96 and the underlayment 20 can be adhesively or otherwise permanently secured together to form a decorative floor construction component/underlayment laminate. This decorative floor construction component/underlayment laminate can be adhesively or otherwise permanently secured to the permanent floor construction component 98 so that the laminate cannot be separated and removed from the permanent floor construction component 98 without substantial damage to the laminate that renders the laminate unsuitable for reuse. This decorative floor construction component/underlayment laminate can be unsecured to the permanent floor construction component 98 whereby the laminate can be separated and removed from the permanent floor construction component 98 without damaging the laminate and, if desired, the laminate can be reused. This decorative floor construction component/underlayment laminate can be separably secured to the permanent floor construction component 98 whereby the laminate can be separated and removed from the permanent floor construction component with no or substantially no damage to the laminate and, if desired, the laminate can be reused.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. An underlayment roll good for on-site application between wall, ceiling, and floor construction components, comprising:

a flexible underlayment comprising a mat of glass fibers that is saturated with a phase change material, the phase change material being disposed about the exterior of the individual glass fibers and being configured to undergo a solid to liquid phase change between about 15° C. (about 60° F.) and about 27° C. (about 80° F.) to provide for a latent storage of thermal energy, wherein the fibrous mat is completely surrounded by and encased within a flexible polymeric film envelope that is impermeable to the phase change material in liquid form, the underlayment being configured to form a layered construction component/underlayment assembly with the underlayment located between the first and second construction components; the underlayment having a length, a width, and a thickness; the underlayment having first and second major surfaces that are each defined by the length and the width of the underlayment; the width of the underlayment being between about 1.5 feet and about 10 feet; the thickness of the underlayment being between about 0.015 inches and about 1 inch, wherein, the fiber density of the mat, the viscosity of the phase change material, the enclosure of the mat and phase change material within the flexible polymeric film envelope limit the migration of the phase change material within the flexible polymeric film envelope; and the underlayment being in roll form.

2. The underlayment roll good according to claim 1, including:

an adhesive on the first major surface of the underlayment for adhering the underlayment to a wall, ceiling, or floor construction component.

3. The underlayment roll good according to claim 2, wherein:

the adhesive on the first major surface of the underlayment is a rewettable adhesive or a pressure sensitive adhesive with a release layer removably overlying the pressure sensitive adhesive to protect the pressure sensitive adhesive from degradation prior to application of the underlayment to a wall, ceiling, or floor board.

4. The underlayment roll good according to claim 1, wherein:
the underlayment comprises the phase change material encapsulated within and having an initial distribution throughout the flexible polymeric film envelope that is impermeable to the phase change material in liquid form and means within the polymeric film envelope to substantially keep the phase change material, when in liquid form, from migrating within the envelope so that the phase change material substantially retains the initial distribution within the envelope through repeated phase changes between solid and liquid form.

5. The underlayment roll good according to claim 1, wherein:
the underlayment includes a sound deadening material having a Young's Modulus between about 50 and about 500 pounds per square inch.

6. The underlayment roll good according to claim 5, wherein:
the underlayment includes a burn through resistant material comprising by weight between about 30% and 50% mica flakes, between about 25% and 35% aramid fibers, and between about 25% and 35% aramid fiber binder.

7. The underlayment roll good according to claim 1, wherein:
the underlayment includes a burn through resistant material comprising by weight between about 30% and 50% mica flakes, between about 25% and 35% aramid fibers, and between about 25% and 35% aramid fiber binder.

8. The underlayment roll good according to claim 1, wherein:
the underlayment has a water vapor permeability of 5 perms or greater.

9. The underlayment roll good according to claim 1, further comprising a scrim reinforcement layer that provides strength and puncture resistance to the underlayment.

10. An underlayment roll good for on-site application between wall, ceiling, and floor construction components, comprising:
a flexible underlayment comprising a polymeric foam material layer that contains microcapsules of a phase change material distributed roughly uniformly throughout the polymeric foam material layer, the microcapsules being between 5 mm and 10 mm in diameter and the phase change material being configured to undergo a solid to liquid phase change between about 15° C. (about 60° F.) and about 27° C. (about 80° F.) to provide for a latent storage of thermal energy, wherein the underlayment is configured to form a layered construction component/underlayment assembly with the underlayment located between the first and second construction components; the underlayment having a length, a width, and a thickness; the underlayment having first and second major surfaces that are each defined by the length and the width of the underlayment; the width of the underlayment being between about 1.5 feet and about 10 feet; the thickness of the underlayment being between about 0.015 inches and about 1 inch, wherein the polymeric foam material layer comprises by weight between about 40% and 60% microcapsules and between about 40% and 60% foam material; and
the underlayment being in roll form.

11. The underlayment roll good according to claim 10, further comprising a glass fiber scrim reinforcement layer.

12. An underlayment roll good for on-site application between wall, ceiling, and floor construction components, comprising:
a flexible underlayment including a mat that is saturated with a phase change material that undergoes a solid to liquid phase change but not a liquid to gas phase change between about 15° C. (about 60° F.) and about 27° C. (about 80° F.) to provide for a latent storage of thermal energy, wherein the mat is completely surrounded by and encased within a flexible polymeric film envelope that is impermeable to the phase change material in liquid form, wherein the underlayment being configured for supplementing physical properties of first and second wall, ceiling, or floor construction components with which the underlayment is used to form a layered construction component/underlayment assembly with the underlayment located between the first and second construction components; the underlayment having a length, a width, and a thickness; the underlayment having first and second major surfaces that are each defined by the length and the width of the underlayment; the width of the underlayment being between about 1.5 feet and about 10 feet; the thickness of the underlayment being between about 0.015 inches and about 0.375 inches, wherein the flexible polymeric film envelope is made of coextruded polyethylene having three layers, wherein the middle layer comprises a higher temperature softening point than the outer layers such that the envelope is self sealing through the application of heat;
the phase change material of the underlayment having an initial distribution; and the underlayment and mat being configured to substantially keep the phase change material from migrating, when in liquid form, from the initial distribution of the phase change material so that the phase change material substantially retains the initial distribution through repeated phase changes between solid and liquid form regardless of the orientation of the underlayment; and
the underlayment being in roll form.

13. The underlayment roll good according to claim 12, wherein:
the underlayment includes a rewettable adhesive on the first major surface of the underlayment for adhering the underlayment to a wall, ceiling, or floor construction component or a pressure sensitive adhesive on the first major surface of the underlayment for adhering the underlayment to a wall, ceiling, or floor construction component with a release layer removably overlying the pressure sensitive adhesive to protect the pressure sensitive adhesive from degradation prior to application of the underlayment.

14. The underlayment roll good according to claim 12, wherein:
the underlayment includes a sound deadening material that provides a second supplemental physical property of sound transmission reduction.

15. The underlayment roll good according to claim 14, wherein:
the underlayment includes a burn through resistant material that provides a third supplemental physical property of burn through resistance.

16. The underlayment roll good according to claim 15, wherein:
the underlayment has a water vapor permeability of 5 perms or greater.

* * * * *